United States Patent
Remmler et al.

(10) Patent No.: US 8,156,836 B2
(45) Date of Patent: Apr. 17, 2012

(54) GEARBOX FOR A MOTOR VEHICLE

(75) Inventors: Mathias Remmler, Mauchenheim (DE); Markus Rockenbach, Schweppenhausen (DE); Axel Geiberger, Mainz (DE); Mikael Mohlin, Kungälv (DE)

(73) Assignee: GM Global Technology Operations LLC, Detroit, MI (US)

( * ) Notice: Subject to any disclaimer, the term of this patent is extended or adjusted under 35 U.S.C. 154(b) by 309 days.

(21) Appl. No.: 12/434,589

(22) Filed: May 1, 2009

(65) Prior Publication Data

US 2009/0272226 A1 Nov. 5, 2009

(30) Foreign Application Priority Data

May 3, 2008 (EP) .................................... 08008387

(51) Int. Cl.
*F16H 3/08* (2006.01)
(52) U.S. Cl. ........................................... 74/331; 74/330
(58) Field of Classification Search ................ 74/330, 74/331, 339, 340, 665 L
See application file for complete search history.

(56) References Cited

U.S. PATENT DOCUMENTS

| 5,715,727 | A * | 2/1998 | Janiszewski | 74/325 |
| 5,799,536 | A * | 9/1998 | Janiszewski et al. | 74/331 |
| 5,906,132 | A * | 5/1999 | Janiszewski | 74/331 |
| 7,077,025 | B2 * | 7/2006 | Janson et al. | 74/331 |
| 7,383,749 | B2 * | 6/2008 | Schaer et al. | 74/340 |
| 7,395,735 | B2 * | 7/2008 | Enstrom et al. | 74/661 |
| 7,469,613 | B2 * | 12/2008 | Krauss et al. | 74/340 |
| 7,669,495 | B2 * | 3/2010 | Kasuya | 74/333 |
| 2007/0240530 | A1 * | 10/2007 | Ogami et al. | 74/330 |
| 2008/0134818 | A1 * | 6/2008 | Gitt | 74/330 |
| 2009/0065283 | A1 * | 3/2009 | Suzuki | 180/374 |
| 2009/0255370 | A1 * | 10/2009 | Remmler et al. | 74/665 E |
| 2009/0266191 | A1 * | 10/2009 | Remmler | 74/331 |
| 2010/0050797 | A1 * | 3/2010 | Ross | 74/331 |
| 2011/0023638 | A1 * | 2/2011 | Mohlin et al. | 74/330 |
| 2011/0048168 | A1 * | 3/2011 | Mohlin et al. | 74/665 S |

FOREIGN PATENT DOCUMENTS

| DE | 19923185 A1 | 12/2000 |
| DE | 102004001278 A1 | 8/2005 |
| EP | 1077336 A1 | 2/2001 |
| EP | 1245863 A2 | 10/2002 |
| EP | 1531285 A1 | 5/2005 |
| EP | 1714816 A1 | 10/2006 |
| WO | 2006128626 A1 | 12/2006 |
| WO | 2011082743 A1 | 7/2011 |

OTHER PUBLICATIONS

British Patent Office, British Search Report for Application No. 08008387.6, dated Oct. 24, 2008.

* cited by examiner

*Primary Examiner* — Justin Holmes
*Assistant Examiner* — Michael Gonzalez
(74) *Attorney, Agent, or Firm* — Ingrassia Fisher & Lorenz, P.C.

(57) ABSTRACT

A gearbox for a motor vehicle is provided that includes, but is not limited to two coaxial input shafts carrying gearwheels, and three layshafts selectively drivable by the input shafts. Each gearwheel of the input shafts meshes with at least one gearwheel of the two layshafts. The three layshafts carry three pinions meshing with a same output gearwheel, and the third layshaft further carries a reverse gearwheel meshing with a gearwheel of the first layshaft.

11 Claims, 2 Drawing Sheets

GEARBOX FOR A MOTOR VEHICLE

CROSS-REFERENCE TO RELATED APPLICATION

This application claims priority to European Patent Application No. 08008387.6-1254, filed May 3, 2008, which is incorporated herein by reference in its entirety.

TECHNICAL FIELD

The present invention relates to a gearbox for a motor vehicle comprising coaxial first and second input shafts carrying a plurality of gearwheels, and first to third layshafts selectively driveable by the gearwheels of said input shafts.

BACKGROUND

Gearboxes having coaxial input shafts have been the subject of intensive development efforts in recent times, due to the expectation that in combination with a double clutch for driving the two input shafts they will allow to combine advantages of conventional automatic transmissions such as easy handling and interruption-free shifting, and of conventional manual transmissions such as fast shifting and high power efficiency.

A gearbox having coaxial input shafts is known (e.g., from DE 199 23 185 A1). In this prior art gearbox, first and second layshafts carry first and second pinions which mesh with an output differential. A reverse gear is established by driving a reverse gearwheel on a first one of these layshafts via an intermediate gearwheel on a third layshaft. Since the transmission ratio of the reverse gear should be similar to that of the first or second gears, the reverse gearwheel must be rather large, similar to the driven gearwheels of the first and second gear. Therefore, the gearbox tends to be bulky and difficult to integrate in a compact vehicle design.

This problem is aggravated by the fact that the gearbox requires a double clutch at its input side for selectively driving the two input shafts. Obviously, such a double clutch occupies considerably more space than a simple clutch required for driving a single input shaft.

The shortage of space can be relieved somewhat by using a so called wet clutch system, in which clutch plates are cooled by a liquid coolant. Since in such a system the clutch plates are cooled much more efficiently than in a "dry" clutch system without liquid coolant, more power can be dissipated per unit of clutch plate surface, so that a wet clutch system can be designed much more compactly than a dry clutch system rated for the same maximum torque.

In view of the foregoing, at least one object of the present invention is to provide a gearbox for a motor vehicle which can be associated to a double clutch system and can be designed very compactly. Although the need to have a compact gearbox is much more pronounced in case of a dry clutch system, the invention is applicable with dry and wet clutch systems alike. In addition, other objects, desirable features, and characteristics will become apparent from the subsequent summary and detailed description, and the appended claims, taken in conjunction with the accompanying drawings and this background.

SUMMARY

The at least one object of the invention, other objects, desirable features and characteristics, are achieved by a gearbox for a motor vehicle comprising coaxial first and second input shafts carrying a plurality of gearwheels and first or third layshafts selectively drivable by the input shafts, each gearwheel of the input shafts meshing with at least one gearwheel of the first or second layshafts, and the three layshafts carry first to third pinions meshing with a same output gearwheel and that the third layshaft further carries a reverse gearwheel meshing with a gearwheel of the first layshaft.

Whereas conventionally torque is transmitted from an input shaft via third and first layshafts to the output differential, by providing a pinion on the third layshaft according to an embodiment of the invention, the order in which the first and third layshafts intervene in the reverse gear is reversed. Therefore, a large gearwheel which must be provided on the first layshaft for use in a low forward gear can be used for generating the reverse gear, too. Thus there is no need for a large gearwheel on the third layshaft, allowing for a compact design of the gearbox.

Preferably, each gearwheel carried by the first to third layshafts has a synchronizer associated to it for selectively locking it to and unlocking it from its respective layshaft. If one of the layshafts transmits torque to the output differential, it can be insured by unlocking the gearwheels of the other two layshafts that the latter can rotate freely, driven via the output differential and their respective pinions.

The gearwheel of the first layshaft that meshes with the reverse gearwheel is preferably rigidly coupled the largest gearwheel of the first layshaft. This largest gearwheel will necessarily be involved in the generation of a low forward gear, so that by rigidly coupling the reverse gearwheel to it, a reverse gear having a transmission ratio similar to the low forward gear can be established.

Preferably, the largest gearwheel of the first layshaft is the largest of all gearwheels of the first to third layshafts. In most cases, such a gearwheel will be involved in establishing the first forward gear.

Preferably, odd numbered gears are supported by gearwheels of the first input shaft, and even numbered gears are supported by gearwheels of the second input shaft. This enables interruption-free shifting between adjacent gears by switching torque from the first to the second input shaft and vice versa.

Further, it is preferred that at least the highest and the second highest gear are supported by gearwheels of the second layshaft. These gearwheels will usually be small when compared to driven gearwheels of the other gears, and by placing these on the second layshaft, it is possible to reduce the width of a gearbox casing in the vicinity of the second layshaft. Preferably, the first input shaft is hollow and the second input shaft extends through the first input shaft. The second layshaft is preferably closer to the input shafts than the first layshaft is. In that way, the diameter of the gearwheels on the second layshaft can be reduced further.

For making the gearbox compact, it is also useful to have at least one gearwheel on the first or second input shaft which meshes with gearwheels on both the first and second layshafts, and which can thus be used for establishing two different gears.

For the sake of compactness, it is further preferred that such a gearwheel is at a central location of the first and second input shafts, and if there is a gearwheel on one of the input shafts which meshes with only one gearwheel of the first and second layshafts, it should be in a terminal location, so that the one of the first and second layshafts which does not carry a gearwheel may be made shorter. Specifically, such terminally located gearwheels may form a second gear.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
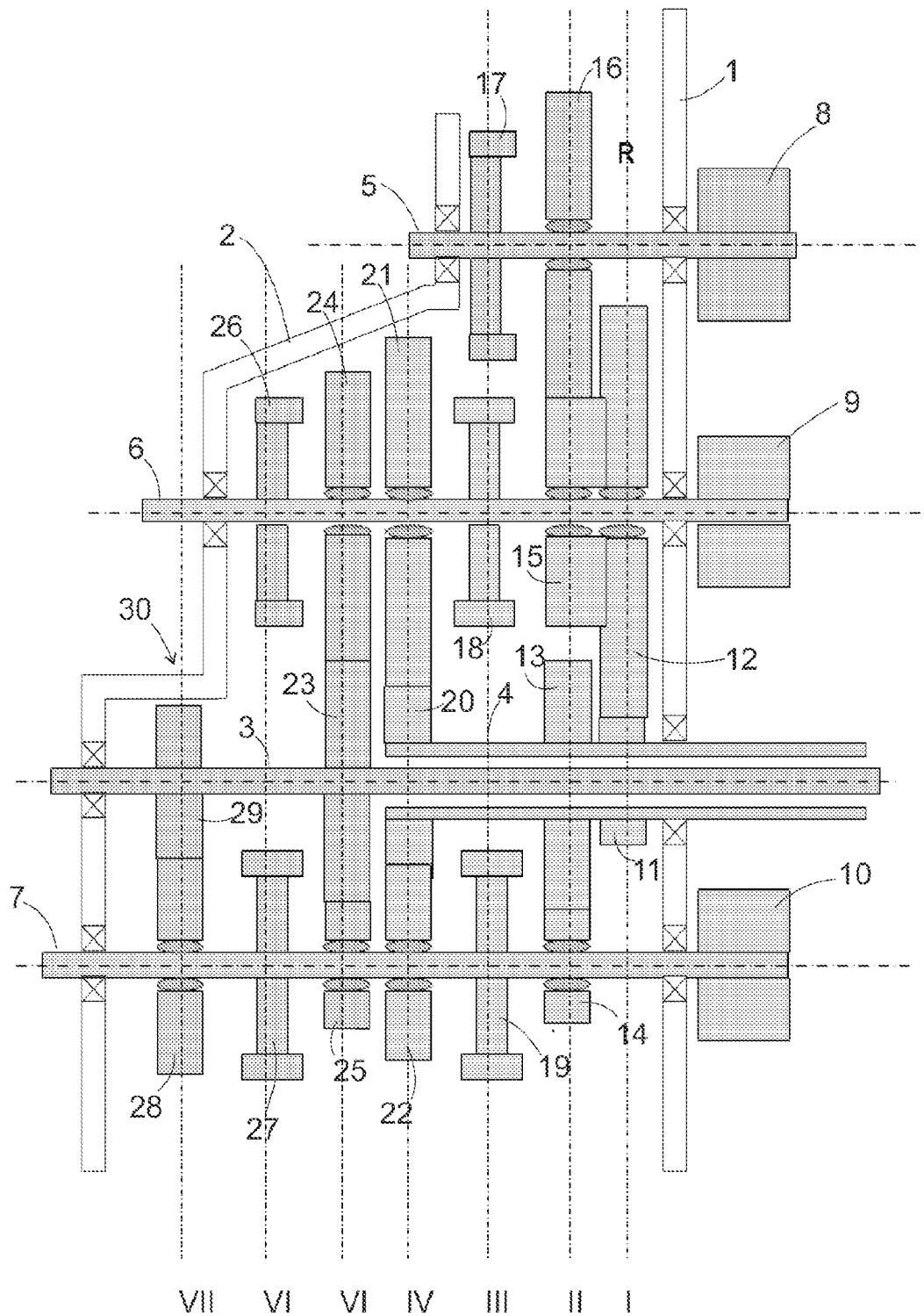
FIG. 1 is a schematic diagram of a gearbox according to a first embodiment of the invention.

The gearbox shown in FIG. 1 has a casing, of which front and rear walls 1, 2 are shown in the drawing. The front wall 1 faces a double clutch, not shown, by which a solid input shaft 3 or a hollow input shaft 4 extending coaxially along solid input shaft 3 are selectively driven. Layshafts 5, 6, 7 are rotatably supported in walls 1, 2. Each layshaft has a portion which extends out of the gearbox casing beyond front wall 1, and which carries a pinion 8, 9, 10, respectively. All three pinions 8, 9, 10 mesh with a same output differential, not shown.

In a plane I immediately adjacent to the front wall 1 inside the gearbox casing, a gearwheel 11 is mounted in a torque proof manner on input shaft 4. Gearwheel 11 drives a gearwheel 12 rotatably mounted on layshaft 6. Gearwheel 11 is the smallest and gearwheel 12 the largest of all gearwheels in the gearbox.

In a second plane II of the gearbox, adjacent to the plane I of gearwheels 11, 12, there is a further gearwheel 13 which is mounted in a torque proof manner on hollow input shaft 4, a gearwheel 14 which is rotatably mounted on layshaft 7 and is driven by gearwheel 13, a gearwheel 15 on layshaft 6 which does not mesh with gearwheel 13 but is rigidly connected with gearwheel 12 and meshes with a gearwheel 16 on layshaft 5.

A subsequent third plane III contains synchronizers 17, 18, 19 on layshafts 5, 6, 7 for selectively locking or unlocking gearwheels 14, 15, 16 to their respective layshafts.

A fourth plane IV contains a gearwheel 20 on hollow input shaft 4, and gearwheels 21, 22 which are rotatably mounted on layshafts 6, 7, respectively, are driven by gearwheel 20 and are adapted to be locked to the respective layshafts by synchronizers 18, 19.

An adjacent plane V holds a gearwheel 23 mounted on solid input shaft 3, and gearwheels 24, 25 rotatably mounted on layshafts 6, 7 and driven by gearwheel 23.

The next plane to the right, VI, contains a synchronizer 26 for selectively locking gearwheel 24 to layshaft 6 and a synchronizer 27 for selectively locking to layshaft 7 gearwheel 25 or a gearwheel 28 located in a plane VII adjacent at the left-hand side and driven by a gearwheel 29 of solid input shaft 3.

In a first forward gear, all driven gearwheels are unlocked except for gearwheels 12, 15, so that torque is transmitted via hollow input shaft 4, gearwheels 11, 12, synchronizer 18, layshaft 6 and pinion 9. A second gear is formed by unlocking all driven gearwheels except gearwheel 28, enabling torque transmission by solid input shaft 3, gearwheels 29, 28, synchronizer 27, layshaft 7 and pinion 10.

A third gear is obtained by locking gearwheel 21, so that torque is transmitted via input shaft 4 and layshaft 6. In a fourth gear, gearwheel 24 is locked, and in gears five to seven, locked gearwheels are gearwheels 22, 25, 14, respectively.

Since all drive gearwheels 11, 13, 20 involved with the odd numbered gears are located on hollow input shaft 4, whereas drive gearwheels 23, 29 of even numbered gears are on solid input shaft 3, interruption-free shifting between adjacent gears is possible by switching torque from hollow input shaft 4 to solid input shaft 3 and vice versa using the double clutch.

Transmission ratios of similar magnitude are obtained for the first gear and the reverse gear by choosing similar diameters for gearwheels 15, 16. In consequence, the distance between layshafts 5 and 6 may not be much larger than the radius of gearwheel 12, and the radii of gearwheels 15, 16 need not be much larger than half the diameter of gearwheel 12, in contrast to the conventional design in which only two layshafts carry pinions which drive the output differential and two large gearwheels are required for first and reverse gears.

Since a rearmost gearwheel 29 of the input shafts meshes with only one driven gearwheel, 28, on layshaft 7, layshaft 6 may be made shorter than layshaft 7, and the volume of the gearbox casing may be reduced by forming a corresponding step 30 in rear wall 2. Moreover, since the driven gearwheel 28 associated to drive gearwheel 29 is on layshaft 7, which is closer to input shafts 3, 4 than layshaft 6 is, the diameter of gearwheels 29, 28 may be made smaller than if the gearwheel driven by drive gearwheel 29 had been provided on layshaft 6. Again, by this measure the volume of the gearbox casing can be reduced.

Figure 2:
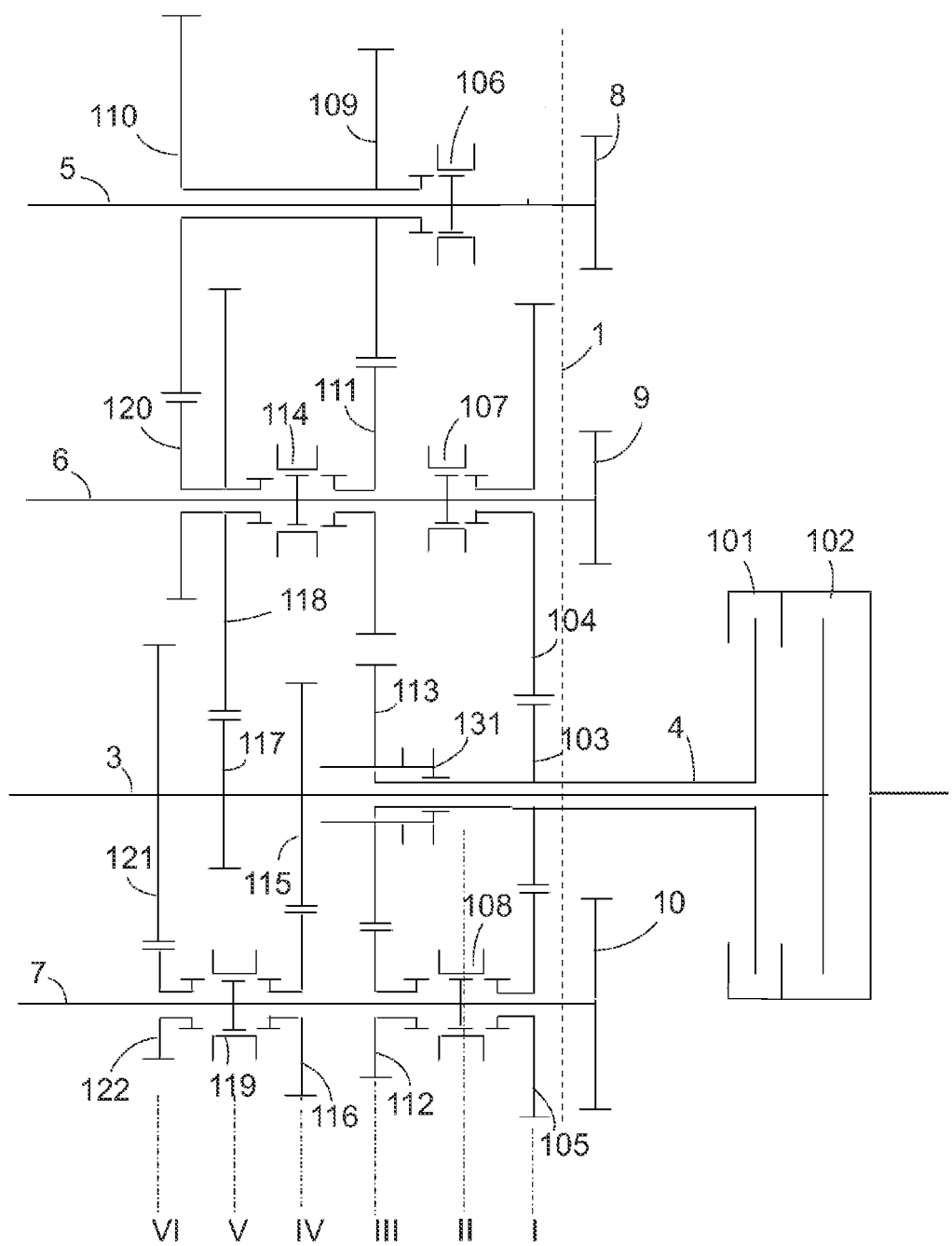
FIG. 2 is a schematic diagram of a gearbox according to a second embodiment of the invention.

FIG. 2 is a diagram of a gearbox according to a second embodiment of the invention. In this diagram, the double clutch for driving input shafts 3, 4 is shown, and its two clutch elements are designated by reference numerals 101, 102.

In a plane I directly adjacent to front wall 1, are provided a drive gearwheel 103 on hollow input shaft 4 and driven gearwheels 104, 105 on layshafts 6, 7, respectively, which mesh with gearwheel 103. A second plane II contains synchronizers 106, 107, 108 on layshafts 5, 6, 7, respectively. Synchronizer 106 is adapted to selectively lock to layshaft 5 rigidly connected gearwheels 109, 110 provided in third and sixth planes III, VI of the gearbox, respectively. Synchronizer 107 selectively locks gearwheel 104 to layshaft 6, and synchronizer 108 selectively locks either gearwheel 105 or gearwheel 112 of the third plane III to layshaft 7.

In the third plane III, gearwheel 112 meshes with a drive gearwheel 113 of hollow input shaft 4. Gearwheels 109, 111 do not mesh with drive gearwheel 113.

A fourth plane IV holds a synchronizer 114 on layshaft 6, a drive gearwheel 115 on solid input shaft 3 and a gearwheel 116 on layshaft 7 which is driven by gearwheel 115.

In a fifth plane V, there is another drive gearwheel 117 of solid input shaft 3, a gearwheel 118 on layshaft 6 which is driven by gearwheel 117, and a synchronizer on layshaft 7.

The sixth plane VI contains, besides already mentioned gearwheel 110, a gearwheel 120 which meshes with gearwheel 110 and is rigidly coupled to gearwheel 118, a drive gearwheel 121 of solid input shaft 3, and a gearwheel 122 driven by gearwheel 121, on layshaft 7.

In this gearbox, a first gear is formed by unlocking all driven gearwheels except gearwheel 111 and driving solid input shaft 3. Torque is thus transmitted via gearwheels 117, 118, 120, 110, 109, 111 to layshaft 6. A reverse gear is obtained by unlocking gearwheel 111 and locking gearwheels 110, 109 to layshaft 5 using synchronizer 106 instead. Since gearwheels 109, 111 have similar sizes, transmission ratios of the first gear and of the reverse gear are similar in magnitude but opposite in direction.

In the second gear torque is applied via hollow input shaft 4, and synchronizer 107 is locked, so that the torque is transmitted to layshaft 6 via gearwheels 103, 104.

In the third gear, synchronizer 107 is unlocked, and synchronizer 114 locks gearwheel 118 to layshaft 6.

In the fourth gear, torque is again applied to hollow input shaft 4, and synchronizer 108 locks gearwheel 105, so that the torque is output by pinion 10 of layshaft 7.

In the fifth gear, synchronizer 108 is unlocked, and synchronizer 119 locks gearwheel 116, so that torque is transmitted to layshaft 7 from solid input shaft 3.

In the sixth gear, synchronizer 118 is unlocked, and synchronizer 108 locks gearwheel 112, so that layshaft 7 is driven by hollow input shaft 4.

In the seventh gear, synchronizer 108 is unlocked, and synchronizer 119 locks gearwheel 122 to layshaft 7.

It is seen that in the lower forward gears one to three, layshaft 6 is driven, whereas in upper gears four to seven, layshaft 7 is driven. For this reason, all gearwheels 105, 112, 116, 122 of layshaft 7 can be made rather small, and the width of the gearbox housing can be reduced in the vicinity of layshaft 7.

As in the first embodiment, the distance between input shafts 3, 4 and layshaft 6 is wider than between input shafts 3, 4 and layshaft 7. For adjusting the spread between high and low gears, the pinions 8, 9, 10 may have different diameters. By making pinions 8, 9 smaller than pinion 10, as shown, a large spread between the gears can be established without having to recur to excessively large or small gearwheels on the layshafts 5, 6, 7.

Between gearwheels 113 and 103, the hollow input shaft 4 carries a dog-ring 131, dogs of which are permanently engaged in holes of gearwheel 113. Upon start-up of the gearbox, by rotating shafts 3, 4 with respect to each other, these dog-rings can be placed in front of matching openings, not shown, in gearwheel 115. By axially displacing the dog-ring 131 the dogs are brought to engage the openings of gearwheel 115, locking the shafts 3, 4 rigidly to each other. In this situation, the two clutch elements can be operated simultaneously to start moving the vehicle. Since in this way friction heat generated upon start-up of the vehicle is distributed all through the clutch elements 101, 102, the temperature increase in each clutch element 101, 102 is smaller than if only one of the two elements is closed. Therefore, the size of the clutch may be reduced without risk of overheating.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A gearbox for a motor vehicle, comprising:
a plurality of gearwheels comprising: a first set of gearwheels, a second set of gearwheels, a third set of gearwheels comprising a first gearwheel rigidly coupled to a largest gearwheel, a fourth set of gearwheels, an output gearwheel and a reverse gearwheel;
a coaxial first input shaft that carries the first set of gearwheels, and a coaxial second input shaft that carries the second set of gearwheels;
a first layshaft that carries the third set of gearwheels and a first pinion that meshes with the output gearwheel, wherein the first layshaft is selectively drivable by the coaxial first input shaft and the coaxial second input shaft;
a second layshaft that carries the fourth set of gearwheels and a second pinion that meshes with the output gearwheel, wherein the second layshaft is selectively drivable by the coaxial first input shaft and the coaxial second input shaft, and wherein each of the first set of gearwheels and the second set of gearwheels mesh with at least one gearwheel of the third set of gearwheels or the fourth set of gearwheels; and
a third layshaft that carries the reverse gearwheel and a third pinion that meshes with the output gearwheel, wherein the third layshaft is selectively drivable by the coaxial first input shaft and the coaxial second input shaft, and wherein the reverse gearwheel meshes with the first gearwheel carried by the first layshaft.

2. The gearbox of claim 1, wherein each gearwheel of the third set of gearwheels has a particular synchronizer associated therewith for selectively locking and unlocking that gearwheel from the first layshaft, and
wherein each gearwheel of the fourth set of gearwheels has a particular synchronizer associated therewith for selectively locking and unlocking that gearwheel from the second layshaft, and
wherein the reverse gearwheel has a particular synchronizer associated therewith for selectively locking and unlocking the reverse gearwheel from the third layshaft.

3. The gearbox of claim 1, wherein the largest gearwheel of the first layshaft is a larger than any of the third set of gearwheels of the first layshaft, the fourth set of gearwheels of the second layshaft, and the reverse gearwheel of the third layshaft.

4. The gearbox of claim 1, wherein the coaxial first input shaft is hollow, and wherein the coaxial second input shaft extends through the coaxial first input shaft.

5. The gearbox of claim 1, wherein odd-numbered gears are implemented using at least one of the first set of gearwheels of the coaxial first input shaft, and even-numbered gears are implemented using at least one of the second set of gearwheels of the coaxial second input shaft.

6. The gearbox of claim 1, wherein at least a first highest and a second highest gear are implemented using gearwheels of the fourth set of gearwheels of the second layshaft.

7. The gearbox of claim 6, wherein the first pinion carried by the first layshaft is smaller than the second pinion carried by the second layshaft.

8. The gearbox of claim 1, wherein the second layshaft is closer to the coaxial first input shaft and the coaxial second input shaft as compared to the first layshaft.

9. The gearbox of claim 1, wherein the first set of gearwheels comprises a first central gearwheel disposed at a central location of the coaxial first input shaft that meshes with one of the gearwheels of the third set of gearwheels on the first layshaft and with one of the gearwheels of the fourth set of gearwheels on the second layshaft,
wherein the second set of gearwheels comprises a second central gearwheel disposed at a central location of the coaxial second input shaft that meshes with another one of the gearwheels of the third set of gearwheels on the first layshaft and with another one of the gearwheels of the fourth set of gearwheels on the second layshaft, and wherein a gearwheel at a terminal location of the coaxial first input shaft meshes with one gearwheel of the fourth set of gearwheels on the second layshaft.

10. The gearbox of claim 9, wherein the gearwheel at the terminal location of the coaxial first input shaft is used to implement a second gear.

11. The gearbox of claim 1, further comprising:
a locking apparatus adapted to selectively lock together the coaxial second input shaft and the coaxial first input shaft.

* * * * *